United States Patent
Taka et al.

(10) Patent No.: US 9,519,081 B2
(45) Date of Patent: Dec. 13, 2016

(54) OPTICAL LAMINATE FILM, INFRARED SHIELDING FILM AND INFRARED SHIELDING BODY

(71) Applicant: Konica Minolta, Inc., Tokyo (JP)

(72) Inventors: Yukako Taka, Tokyo (JP); Takahiko Nojima, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 309 days.

(21) Appl. No.: 14/364,507

(22) PCT Filed: Dec. 10, 2012

(86) PCT No.: PCT/JP2012/081951
§ 371 (c)(1),
(2) Date: Jun. 11, 2014

(87) PCT Pub. No.: WO2013/089066
PCT Pub. Date: Jun. 20, 2013

(65) Prior Publication Data
US 2014/0320956 A1 Oct. 30, 2014

(30) Foreign Application Priority Data
Dec. 12, 2011 (JP) ................................. 2011-271500

(51) Int. Cl.
| | |
|---|---|
| G02B 5/20 | (2006.01) |
| G02B 1/10 | (2015.01) |
| G02B 1/11 | (2015.01) |
| G02B 5/22 | (2006.01) |
| C09D 5/33 | (2006.01) |
| G02B 1/113 | (2015.01) |

(52) U.S. Cl.
CPC ............... *G02B 1/10* (2013.01); *C09D 5/004* (2013.01); *G02B 1/11* (2013.01); *G02B 1/113* (2013.01); *G02B 5/208* (2013.01); *G02B 5/22* (2013.01)

(58) Field of Classification Search
None
See application file for complete search history.

(56) References Cited

U.S. PATENT DOCUMENTS

| | | | | |
|---|---|---|---|---|
| 6,791,649 B1 * | 9/2004 | Nakamura | ............ | G02B 1/111 |
| | | | | 349/137 |
| 7,371,786 B2 * | 5/2008 | Yoshihara | ............... | C09D 4/00 |
| | | | | 523/205 |

FOREIGN PATENT DOCUMENTS

| | | | | | |
|---|---|---|---|---|---|
| CN | 101501533 | A | | 8/2009 | |
| JP | H08-110401 | A | | 4/1996 | |
| JP | 2003-266577 | A | | 9/2003 | |
| JP | 2003266577 | A | * | 9/2003 | ............... B32B 7/02 |
| JP | 2004-123766 | A | | 4/2004 | |
| JP | 2005-129437 | A | | 5/2005 | |
| JP | 2007-111940 | A | | 5/2007 | |
| JP | 2009086659 | | | 11/2008 | |
| JP | 2009086659 | A | * | 4/2009 | ............... G02B 5/26 |

OTHER PUBLICATIONS

Yamakawa et al. (JP 2009-086659 A)—(Apr. 2009); [JPP—Machine Translation to English].*
Ando et al. (JP 2006-266577 A)—(Sep. 2003); [EPO—Machine Translation to English].*
Chinese Office Action.
English Translation of Chinese Office Action.
PCT/JP2012/081951 International Preliminary Report on Patentability and Written Opinion in English and Japanese, date of issuance Jun. 17, 2014 (11 pages).
Office Action dated Jun. 28, 2016 from the corresponding Japanese Application; Application No. 2013-549255; English translation of Office Action: Total of 4 pages.

* cited by examiner

*Primary Examiner* — David Sample
*Assistant Examiner* — Donald M Flores, Jr.
(74) *Attorney, Agent, or Firm* — Lucas & Mercanti, LLP

(57) ABSTRACT

Provided are an optical laminate film superior in film flexibility and film surface uniformity, has high light transmittance in a predetermined wavelength region, and is superior in light shielding properties in another predetermined wavelength region, an infrared shielding film, a method of manufacturing an infrared shielding film, and an infrared shielding body provided with the infrared shielding film.
The optical laminate film has, on a substrate, at least one unit constituted of a high refractive index layer and a low refractive index layer containing metal oxide particles and silanol modified polyvinyl alcohol.

33 Claims, No Drawings

OPTICAL LAMINATE FILM, INFRARED SHIELDING FILM AND INFRARED SHIELDING BODY

CROSS REFERENCE TO RELATED APPLICATION

This Application is a 371 of PCT/JP2012/081951 filed on Dec. 10, 2012 which, in turn, claimed the priority of Japanese Patent Application No. JP2011-271500 filed on Dec. 12, 2011 both applications are incorporated herein by reference.

TECHNICAL FIELD

The present invention relates to an optical laminate film, an infrared shielding film, and an infrared shielding body.

BACKGROUND ART

Recently, interest in energy saving measures is increasing, and, for example, from the viewpoint of reducing the load on cooling equipment, there have been increased demands for an infrared shielding film which is mounted to a window glass of a building and a vehicle to block transmission of heat rays of sunlight.

As a method of infrared shielding film formation, there has been mainly proposed a method of forming a laminate unit constituted of alternately stacked high refractive index layers and low refractive index layers using a dry film-forming method such as a vapor deposition method and a sputtering method. However, in the dry film-forming method, a vacuum apparatus used in the formation is increased in size to increase manufacturing cost, and it is difficult to increase the area. In addition, there is a problem that a substrate is limited to a thermal-resistant material.

Recently, there is widely considered a method of forming an infrared shielding film using a wet coating method instead of the dry film-forming method having the above problems (Patent Literatures 1 to 3).

For example, Patent Literature 1 discloses a method of coating a high refractive index layer coating liquid, prepared by dispersing a thermosetting silicone resin containing fine particles of a metal compound such as metal oxide, an ultraviolet hardening acrylic resin, or the like in an organic solvent, onto a substrate using a wet coating method using a bar coater to form a transparent laminate. Patent Literature 2 discloses a method of coating a coating liquid for a high refractive index, constituted of rutile-type titanium dioxide, a heterocyclic nitrogen compound (for example, pyridine), an ultraviolet hardening binder, and an organic solvent, onto a substrate using a wet coating method using a bar coater to form a transparent laminate. Patent Literature 3 discloses a method of alternately stacking layers using a methanol-dispersed slurry of spherical rutile type titanium oxide particles and methanol silica sol.

CITATION LIST

Patent Literature

Patent Literature 1: Japanese Patent Application Laid-Open No. 8-110401
Patent Literature 2: Japanese Patent Application Laid-Open No. 2004-123766
Patent Literature 3: Japanese Patent Application Laid-Open No. 2003-266577

SUMMARY OF INVENTION

Technical Problem

In the methods disclosed in Patent Literatures 1 and 2, since a medium of a refractive index coating liquid (for example, a coating liquid for a low refractive index layer) is mainly formed of an organic solvent, a large amount of the organic solvent is scattered in the formation and drying of a low refractive index later, so that there are environmental problems. Further, in this method, since the ultraviolet hardening acrylic resin is used, an obtained film is cured with ultraviolet rays, and there is a problem that the coating film physical properties have poor flexibility.

In the method described in Patent Literature 3, since a low refractive index layer is formed using metal oxide, an obtained film is brittle and there is a problem that haze is high due to a void formed at a particle interface.

The present invention is achieved in view of the problems described above, and an object thereof is to provide an optical laminate film which has at least one unit constituted of a high refractive index layer and a low refractive index layer containing metal oxide particles, and the optical laminate film is excellent in film flexibility and film surface uniformity, has high light transmittance in a predetermined wavelength region, and is excellent in light shielding properties in another predetermined wavelength region. Another object of the present invention is to provide an infrared shielding film, a method of manufacturing an infrared shielding film, and an infrared shielding body provided with the infrared shielding film.

Another object of the present invention is to provide a method of manufacturing an optical laminate film which can be manufactured using a water-based coating liquid for refractive index, has a large area, and can be provided at a low cost.

Solution to Problem

As a result of intensive studies made by the present inventors in order to solve the above problems, it was found that the objects of the present invention were achieved by the following constitution.

Namely, the present invention relates to an optical laminate film which has, on a substrate, at least one unit constituted of a high refractive index layer and a low refractive index layer containing metal oxide particles and silanol modified polyvinyl alcohol.

DESCRIPTION OF EMBODIMENTS

The present invention provides an optical laminate film which is excellent in film flexibility and film surface uniformity, has high light transmittance in a predetermined wavelength region, and is excellent in light shielding properties in another predetermined wavelength region. This invention further provides an infrared shielding film, a method of manufacturing an infrared shielding film, and an infrared shielding body provided with the infrared shielding film.

Hereinafter, embodiments for carrying out the present invention will be described in detail.

As described above, the present inventors conducted intensive studies in view of the above problems. As a result, surprisingly, the inventors found that the above problems are solved by an optical laminate film including a high refractive index layer and a low refractive index layer containing first metal oxide particles and silanol modified polyvinyl alcohol, and the present invention is completed accordingly.

Namely, the present inventors found that in an optical laminate film having, on a substrate, at least one unit constituted of a high refractive index layer and a low refractive index layer, at least one layer of the low refractive index layers contains metal oxide particles and silanol modified polyvinyl alcohol, whereby an optical laminate film which can be manufactured at a low cost, can increase the area, is excellent in film flexibility and film surface uniformity, has high light transmittance in a predetermined wavelength region, and is excellent in light shielding properties in another predetermined wavelength region can be realized, and the present inventors reached the present invention.

A mechanism of exhibiting the operational advantages according to the above constitution of the present invention is presumed as follows.

Namely, usually the objective optical laminate film is manufactured with high productivity by using coating liquids capable of forming a high refractive index layer and a low refractive index layer and coating a unit, formed by the respective coating liquids, at least layer by layer, preferably stacking the units alternately, to provide a multilayer configuration. When a water-based coating liquid is used, coating liquid components of the respective layers including the high refractive index layer and the low refractive index layer are prevented from being mixed as much as possible, whereby the refractive index designed for each layer is required to be secured. To do this, it is possible to suppress inter-layer mixture due to diffusion of metal oxide particles at an interface between the high refractive index layer and the low refractive index layer each coated with the coating liquid.

Meanwhile, the optical laminate film according to the present invention is characterized in that at least one of the low refractive index layers contain metal oxide particles and silanol modified polyvinyl alcohol. A hydrogen bond network between the metal oxide particles and the silanol modified polyvinyl alcohol is strongly formed due to the constitution of the present invention, whereby the inter-layer mixture between the high refractive index layer and the low refractive index layer is suppressed, light shielding properties (preferably infrared shielding properties) in another predetermined wavelength region are achieved, and it is considered that film flexibility and haze of a film are improved. When the silanol modified polyvinyl alcohol is used in both the low refractive index layer and the high refractive index layer, the haze is further improved to enhance film transparency, and thus it is more preferable.

Hereinafter, the optical laminate film of the present invention, constituents of an infrared shielding film, modes for carrying out the present invention, and so on will be described in detail.

The optical laminate film of the present invention has, on a substrate, at least one unit constituted of a high refractive index layer and a low refractive index layer containing metal oxide particles and silanol modified polyvinyl alcohol.

[Optical Laminate Film]

The optical laminate film of this embodiment includes a substrate and a reflective layer reflecting at least light in a specified wavelength region. The reflective layer has a plurality of stacked refractive index layers, and at least one of the refractive index layers has a refractive index different from that of the adjacent refractive index layer. In general, the refractive index layer includes at least one laminate (unit) constituted of a low refractive index layer and a high refractive index layer and has the form of an alternate laminate in which the low refractive index layer and the high refractive index layer are alternately stacked. In this specification, a refractive index layer having high refractive index with respect to the other is referred to as the high refractive index layer, and a refractive index layer having low refractive index with respect to the other is referred to as the low refractive index layer.

In this specification, the terms "high refractive index layer" and "low refractive index layer" mean that when a refractive index difference between adjacent two layers is compared, the refractive index layer having higher refractive index is the high refractive index layer, and the refractive index layer having lower refractive index is the low refractive index layer. Accordingly, the terms "high refractive index layer" and "low refractive index layer" include any form other than the form in which in each refractive index layer constituting the optical laminate film, when two adjacent refractive index layers are focused, each refractive index layer has the same refractive index.

Although the optical laminate film has a reflective layer reflecting light including ultraviolet light, infrared light, and so on, the optical laminate film is preferably an infrared shielding film having a reflective layer mainly reflecting at least infrared light. Namely, in a preferred embodiment of the present invention, an infrared shielding film having a substrate and a reflective layer reflecting at least light is provided, the reflective layer has a plurality of stacked refractive index layers, at least one of the refractive index layers has a different refractive index from the adjacent refractive index layer, the one refractive index layer contains metal oxide particles and silanol modified polyvinyl alcohol. Thus, hereinafter, these films are sometimes referred to as "optical laminate films" or "infrared shielding film." Hereinafter, although the infrared shielding film will be described, the description can be applied to the optical laminate film.

[Infrared Shielding Film]

According to the present invention, an infrared shielding film which is superior in film flexibility and film surface uniformity, has a high visible light transmittance, and is superior in infrared shielding properties is provided.

The infrared shielding film of the present embodiment includes a substrate and at least one unit constituted of a low refractive index layer and a high refractive index layer. The infrared shielding film of the present invention preferably has the form of an alternate laminate in which the low refractive index layer and the high refractive index layer are alternately stacked.

In the present embodiment, although the infrared shielding film includes at least one unit constituted of two layers having different refractive indexes, that is, the high refractive index layer and the low refractive index layer, the high refractive index layer and the low refractive index layer are considered as follows. For example, when the high refractive index layer and the low refractive index layer contain metal oxide particles, the metal oxide particles contained in the low refractive index layer (hereinafter referred to as "first metal oxide particles") and the metal oxide particles contained in the high refractive index layer (hereinafter referred to as "second metal oxide particles") are mixed at an interface between the two layers, and a layer containing the first metal oxide particles and the second metal oxide particles may be formed. In this case, the layer is considered as the low refractive index layer or the high refractive index layer based on the abundance ratio of the first metal oxide particles and the second metal oxide particles. Specifically, the low refractive index layer means a layer containing the first metal oxide particles in an amount of 50 to 100% by mass based on the total mass of the first metal oxide particles and the second metal oxide particles. The high refractive index layer means a layer containing the second metal oxide particles in an amount of more than 50% by mass and not more than 100% by mass. The kind and amount of the metal oxide particles contained in the refractive index layer can be analyzed by energy dispersive X-ray spectrometry (EDX). Alternatively, a metal oxide concentration profile is measured in a film thickness direction in a laminated film, and the layer can be determined as the high refractive index layer or the low refractive index layer based on the composition. The metal oxide concentration profile can be observed by sputtering at a rate of 0.5 nm/min when the outermost surface is 0 nm and measuring an atomic composition ratio, using an XPS surface analyzer. In a laminate in which a low refractive index component or a high refractive index component does not contain the metal oxide particle and which is formed by only an organic binder, in a similar manner, the presence of a mixing region is confirmed by measuring, for example, a carbon concentration in a film thickness direction in an organic binder concentration profile, and the composition is measured by EDX, whereby each layer etched by sputtering can be determined as the high refractive index layer or the low refractive index layer. The XPS surface analyzer is not limited particularly, and although any type may be used, ESCALAB-200R manufactured by VG Scientific is used as the XPS surface analyzer. Mg is used in the X-ray anode and measured at output 600 W (acceleration pressure 15 kV, Emission current 40 mA).

In general, in the infrared shielding film, it is preferable that a difference between the low refractive index layer and the high refractive index layer is designed large based on the concept that an infrared reflectivity can be enhanced with a small number of layers. In this embodiment, in at least one of units constituted of the low refractive index layer and the high refractive index layer, the refractive index difference between the low refractive index layer and the high refractive index layer adjacent to each other is preferably not less than 0.1, more preferably not less than 0.3, more preferably not less than 0.35, particularly preferably not less than 0.4. When the infrared shielding film has a plurality of units including the low refractive index layer and the high refractive index layer, it is preferable that the refractive index difference between the high refractive index layer and the low refractive index layer in all the units is in the above preferred range. However, the outermost layer and the undermost layer may have an outside range of the above preferred constitution. In the infrared shielding film of this embodiment, a refractive index of the low refractive index layer is preferably 1.10 to 1.60, more preferably 1.30 to 1.50. Meanwhile, the refractive index of the high refractive index layer is preferably 1.80 to 2.50, more preferably 1.90 to 2.20.

The refractive index in a specific wavelength region is determined by the refractive index difference between adjacent two layers and the number of stacked layers, and as the refractive index difference becomes larger, the same refractive index is obtained with a smaller number of layers. The refractive index difference and the number of required layers can be calculated by using a commercially available optical design soft. For example, in order to obtain an infrared refractive index of not less than 90%, 200 layers or more are required to be stacked when the refractive index difference is less than 0.1, so that productivity is lowered, and, in addition, scattering at a lamination interface is increased, whereby transparency is lowered, and it becomes difficult to manufacture without failure. Although there is no upper limit of the refractive index difference in terms of enhancement of the reflectance and reduction in the number of layers, the limit of the refractive index is substantially approximately 1.4.

As optical characteristics of the infrared shielding film of this embodiment, the transmittance in a visible light region shown in JIS R3106-1998 is not less than 50%, preferably not less than 75%, more preferably not less than 85%. Further, it is preferable that there is a region in which the reflectance is more than 50% in a region with a wavelength of 900 nm to 1400 nm.

The infrared shielding film of this embodiment may have a configuration including, on a substrate, at least one unit constituted of the high refractive index layer and the low refractive index layer. In the number of the high refractive index layers and the number of the low refractive index layers, the total number of the layers is not more than 100 layers, that is, not more than 50 units, preferably not more than 40 layers (20 units), more preferably not more than 20 layers (10 units). The infrared shielding film of the present invention may have a configuration in which at least the above unit is stacked, and, for example, even if the infrared shielding film may be a laminated film whose both outermost layer and undermost layer are the high refractive index layers or the low refractive index layers.

The entire thickness of the infrared shielding film of this embodiment is preferably 12 μm to 315 μm, preferably 15 μm to 200 μm, more preferably 20 μm to 100 μm. The thickness per one layer of the low refractive index layers is preferably 20 to 800 nm, more preferably 50 to 350 nm. Meanwhile, the thickness per one layer of the high refractive index layers is preferably 20 to 800 nm, more preferably 50 to 350 nm.

In the infrared shielding film of this embodiment, it is preferable that at least one layer of the high refractive index layers has a thickness different from the thicknesses of other layers (and namely, all of the high refractive index layers do not have the same thickness), or at least one layer of the low refractive index layers has a different thickness (and namely, all of the low refractive index layers do not have the same thickness). According to this constitution, the adhesiveness and coatability with the substrate can be enhanced, and, in addition, the wavelength region can be easily widened and narrowed.

Here, in the low refractive index layers constituting the reflective layer, it is preferable that the refractive index layer as the undermost layer which is closest to or in contact with the substrate has a thickness of 4 to 15 times an average thickness of the refractive index layers other than the undermost layer (other refractive index layers). When the thickness of the undermost layer is increased, the adhesiveness with the substrate can be enhanced, and a good coatability can be achieved. The ratio of the thickness of the undermost layer [=(thickness of the undermost layer (nm))/(thickness of other refractive index layers (nm))] to the thickness of other refractive index layers (average thickness: total thickness/the number of layers) is preferably 4 to 15 times, more preferably 5 to 12 times. According to this constitution, the adhesiveness and coatability with the substrate can be further enhanced. Further, occurrence of coating stripes or the like can be suppressed while the undermost layer has certain strength. As a result, a problem of application of the infrared shielding film onto a base structure and occurrence of cracks can be prevented, and lowering of visible light transmissivity and infrared shielding properties of the infrared shielding film can be suppressed. "Other refractive index layers" mean all refractive index layers other than the undermost layer located on the side where the undermost layer of the substrate is provided. Accordingly, when the refractive index layer is formed on the side opposite to the side where the undermost layer is provided (when the refractive index layers are formed on both surfaces of the substrate), the refractive index layer on the opposite side is not included in the "other refractive index layers." Since the thickness (film thickness) of the undermost layer is compared with an average thickness (average film thickness) of other refractive index layers constituting the reflective layer, the other refractive index layers may include a layer thicker than the undermost layer.

In order to add additional functions, the infrared shielding film may have, under the substrate or on the outermost layer on the opposite side of the substrate, at least one functional layer such as a conductivity layer, an antistatic layer, a gas barrier layer, an easy adhesive layer (adhesive layer), an antifouling layer, a deodorant layer, a drip layer, an easy slipping layer, a hard coat layer, an abrasion-resistant layer, an antireflection layer, an electromagnetic wave shield layer, an ultraviolet ray absorbing layer, an infrared ray absorbing layer, a printing layer, a fluorescent light-emitting layer, a hologram layer, a peeling layer, a viscose layer, an adhesive layer, infrared ray cutting layers (a metal layer and a liquid crystal layer) other than the high refractive index layer and the low refractive index layer of the present invention, a colored layer (visible light absorbing layer), and an intermediate film layer used in laminated glass.

Next, an outline of a basic configuration of the high refractive index layer and the low refractive index layer in the infrared shielding film of the present invention will be described.

[Low Refractive Index Layer]

The low refractive index layer according to the present invention contains first metal oxide particles and silanol modified polyvinyl alcohol. In this invention, the low refractive index layer preferably contains a binder resin and may further contain a protecting agent, a hardening agent, an emulsion region, and various other additives.

[Silanol Modified Polyvinyl Alcohol]

The silanol modified polyvinyl alcohol used in the low refractive index layer of the present invention is not limited particularly and may be synthesized by a well-known method or may be a commercial product. The polymerization degree of the silanol modified polyvinyl alcohol is usually 300 to 2,500 and preferably 500 to 1,700. The lower limit of the polymerization degree is either any lower limit value in a numerical range of the polymerization degree or any of the numerical values of the polymerization degree employed in the examples to be described later. Further, a numerical range in which any of the numerical values employed in the examples to be described later is the upper limit is preferable, and a numerical range in which any of the numerical values employed in the examples to be described later is the upper limit, and any of the numerical values employed in the examples to be described later is the lower limit is preferable. When the polymerization degree is not less than 300, the strength of a coating layer is high, and when the polymerization degree is not more than 2500, the viscosity of a coating liquid is not increased too much, there is a process suitability, and thus it is preferable. The modification percentage of the silanol modified polyvinyl alcohol is usually 0.01 to 5 mol % and preferably 0.1 to 1 mol %.

When the modification percentage is less than 0.01 mol %, the water resistance may be deteriorated, and when the modification percentage is more than 5 mol %, the solubility with water may be deteriorated. Among the above silanol modified polyvinyl alcohols, the silanol modified polyvinyl alcohol whose saponification degree is preferably not less than 95 mol %, more preferably 95.0 to 99.5 mol % is preferable in terms of scratch resistance and a gloss track.

The content of the silanol modified polyvinyl alcohol is preferably 3 to 40% by mass, more preferably 5 to 30% by mass, particularly preferably 10 to 25% by mass, based on 100% by mass of the total solid content of the low refractive index layer. When the content of the silanol modified polyvinyl alcohol is not less than 3% by mass, the setting properties are improved; therefore, a film is less likely to be disturbed, and the haze is improved. When the content of the silanol modified polyvinyl alcohol is not more than 40% by mass, liquid stability is good, and thus it is preferable.

[First Metal Oxide Particle]

Examples of the first metal oxide particle used in the low refractive index layer of the present invention may include zinc oxide, silicon dioxide such as synthetic amorphous silica and colloidal silica, alumina, and colloidal alumina. In the present invention, in order to adjust the refractive index, one kind of the first metal oxide particle may be used, or two or more kinds of the first metal oxide particle may be used together.

In the low refractive index layer according to the present invention, silicon dioxide is preferably used as the first metal oxide particle, and colloidal silica is more preferably used.

An average particle diameter (average of the number) of the first metal oxide particles (preferably silicon dioxide) contained in the low refractive index layer of the present invention is preferably 3 to 100 nm, more preferably 3 to 50 nm.

In this specification, the particles themselves or the particles appearing on a cross-section or a surface of a refractive index layer are observed with an electron microscope, and particle diameters of 1000 arbitrary particles are measured, whereby the average particle diameter (average of the number) of the first metal oxide particles is obtained as a simple average value (number average). The particle diameters of the individual particles are represented by a diameter of an assumed circle equal to the projection area of the particles.

Colloidal silica used in the present invention is obtained by double decomposition with acid of sodium silicate or the like or heating and aging silica sol produced by passing through an ion exchange resin layer and described in, for example, Japanese Patent Application Laid-Open No. S57-14091, Japanese Patent Application Laid-Open No. S60-219083, Japanese Patent Application Laid-Open No. S60-219084, Japanese Patent Application Laid-Open No. S61-20792, Japanese Patent Application Laid-Open No. S61-188183, Japanese Patent Application Laid-Open No. S63-17807, Japanese Patent Application Laid-Open No. H4-93284, Japanese Patent Application Laid-Open No. H5-278324, Japanese Patent Application Laid-Open No. H6-92011, Japanese Patent Application Laid-Open No. H6-183134, Japanese Patent Application Laid-Open No. H6-297830, Japanese Patent Application Laid-Open No. H7-81214, Japanese Patent Application Laid-Open No. H7-101142, Japanese Patent Application Laid-Open No. H7-179029, Japanese Patent Application Laid-Open No. H7-137431, and WO 94/26530.

Synthetic materials and commercial products may be used as the colloidal silica as described above. Examples of the commercial products include Snow tex series (such as Snow tex OS, OXS, S, OS, 20, 30, 40, O, N, and C) sold by Nissan Chemical Industries, Ltd.

In the colloidal silica, the surface may be cationically modified and may be treated with Al, Ca, Mg, Ba, or the like.

The content of the first metal oxide particles in the low refractive index layer is preferably 20 to 75% by mass, more preferably 30 to 70% by mass, still more preferably 35 to 69% by mass, particularly preferably 40 to 68% by mass, based on 100% by mass of the total solid content of the low refractive index layer. When the content of the first metal oxide particles is not less than 20% by mass, a desired refractive index is obtained, when the content is not more than 75% by mass, the coatability is good, and thus it is preferable.

In the low refractive index layer of the present invention, the first metal oxide particles and silanol modified polyvinyl alcohol may be contained in at least one of the high refractive index layers.

[Binder Resin]

In the infrared shielding film according to the present invention, the low refractive index layer may contain a binder resin other than silanol modified polyvinyl alcohol. A water-soluble binder resin is preferably used as the binder resin. When the water-soluble binder resin is used together, a stable coating liquid can be produced.

When silanol modified polyvinyl alcohol and the binder resin (preferably unmodified polyvinyl alcohol) are used together in the low refractive index layer of the present invention, a coating liquid for the low refractive index layer has excellent liquid stability, so that excellent coatability is obtained, and thus it is preferable.

In this specification, the binder resin is a dispersion medium of a dispersed substance such as metal oxide particles and silanol modified polyvinyl alcohol and means a polymer compound having a mass average molecular weight of 1,000 to 200,000 (preferably 3,000 to 60,000). The water-soluble binder resin in the present invention is a water-soluble polymer compound (hereinafter also referred to simply as "water soluble polymer") in which when dissolved in water with a concentration of 0.5% by mass at a temperature at which a water-soluble polymer compound is best dissolved, the mass of an insoluble matter filtered when filtration is performed with a G2 glass filter (maximum pore size: 40 to 50 μm) is within 50% by mass of the added water-soluble polymer compound.

Hereinafter, in the infrared shielding film according to this embodiment, polyvinyl alcohol preferably used as a binder resin in at least one of the low refractive index layers will be first described.

Examples of the polyvinyl alcohol preferably used in the present invention include not only usual polyvinyl alcohol obtained by hydrolyzing polyvinyl acetate (unmodified polyvinyl alcohol) but also modified polyvinyl alcohol such as polyvinyl alcohol having a cationically modified terminal and anion modified polyvinyl alcohol having an anionic group.

An average polymerization degree of polyvinyl alcohol obtained by hydrolyzing polyvinyl acetate (unmodified polyvinyl alcohol) is preferably 500 to 5,000, more preferably 1,000 to 5,000, particularly preferably 1,500 to 5,000, most preferably 2,000 to 4,000. Namely, as a preferred embodiment of the present invention, the low refractive index layer further contains unmodified polyvinyl alcohol having a polymerization degree of 1,500 to 5,000. This is because when the polymerization degree of unmodified polyvinyl alcohol is not less than 1,500, the flexibility of a coating film is good, and when the polymerization degree of unmodified polyvinyl alcohol is not more than 5,000, a coating liquid is stabilized. When the polymerization degree is not less than 2,000, the coating film is not cracked, the haze is improved, and thus it is preferable. The saponification degree is preferably 70 to 100 mol %, particularly preferably 80 to 99.5 mol %.

Cation modified polyvinyl alcohol is polyvinyl alcohol having primary to tertiary amino groups and a quaternary ammonium group in a main chain or a side chain of the above-described polyvinyl alcohol as described in Japanese Patent Application Laid-Open No. S61-10483, for example and is obtained by saponifying a copolymer of an ethylenically unsaturated monomer having a cationic group and vinyl acetate.

Examples of an ethylenically unsaturated monomer having a cationic group include trimethyl-(2-acrylamide-2,2-dimethylethyl) ammonium chloride, trimethyl-(3-acrylamide-3,3-dimethylpropyl) ammonium chloride, N-vinyl imidazole, N-vinyl-2-methylimidazole, N-(3-dimethylaminopropyl) methacrylamide, hydroxyethyl trimethylammonium chloride, trimethyl-(2-methacrylamidopropyl) ammonium chloride, and N-(1,1-dimethyl-3-dimethylaminopropyl) acrylamide. The ratio of a cation modified group containing monomer of cation modified polyvinyl alcohol is from 0.1 to 10 mol % and preferably from 0.2 to 5 mol %, based on vinyl acetate.

Examples of an anion modified polyvinyl alcohol include polyvinyl alcohol having anion groups as described in Japanese Patent Application Laid-Open No. H1-206088, copolymers of vinyl alcohol and a vinyl compound having a water-soluble group as described in Japanese Patent Application Laid-Open Nos. S61-237681 and S63-307979, and modified polyvinyl alcohol having a water-soluble group as described in Japanese Patent Application Laid-Open No. H7-285265.

Examples of nonion modified polyvinyl alcohol include polyvinyl alcohol derivatives, in which a polyalkylene oxide group is added to a part of vinyl alcohol, as described in Japanese Patent Application Laid-Open No. H7-9758 and block copolymers of a vinyl compound having a hydrophobic group and vinyl alcohol described in Japanese Patent Application Laid-Open No. H8-25795. Polyvinyl alcohol may be used in combination of two or more kinds, such as of different polymerization degrees or kinds of modification.

In the present invention, the binder resin is contained in a range of preferably 5.0 to 50% by mass, more preferably 10 to 40% by mass, still more preferably 14 to 30% by mass, based on 100% by mass of the total solid content of the low refractive index layer. When water-soluble polymer is less than 5.0% by mass, a tendency that upon drying after coating of a refractive index layer, a film surface is disturbed, and transparency is deteriorated becomes strong. Meanwhile, when the content is not more than 50% by mass, the relative content of metal oxide is suitable, and the refractive index difference between the low refractive index layer and the high refractive index layer is easily increased.

[Protective Agent]

In one embodiment of the present invention, the low refractive index layer preferably contains at least two kinds of water-soluble resins. In this case, it is preferable that at least one kind coats (or protects) the first metal oxide particle, and another kind functions as a binder resin. Hereinafter, a water-soluble resin coating (protecting) the first metal oxide particles will be described. The water-soluble resin serves for facilitating dispersion of metal oxide particles in a solvent and hereinafter referred to as a "protective agent."

It is preferable in terms of stabilization of metal oxide fine particles that the protective agent is a water-soluble resin having a polymerization degree of preferably 100 to 700, more preferably 200 to 500. Although the protective agent is preferably polyvinyl alcohol in terms of absorptivity, the protective agent is more preferably modified polyvinyl alcohol in terms of transparency and stabilization. When the saponification degree of polyvinyl alcohol is preferably not less than 95% mol, more preferably 98 to 99.5 mol %, the absorptivity for particles is strong, and thus it is preferable. Description of polyvinyl alcohol is omitted because polyvinyl alcohol has been described in the description of the binder resin.

In the present invention, the protective agent is contained in a range of preferably 0.1 to 30% by mass, more preferably 0.5 to 20% by mass, still more preferably 1 to 10% by mass, based on 100% by mass of metal oxide particles. When the protective agent is contained in the above range, a coating liquid for the low refractive index layer has excellent liquid stability, so that the coatability is stabilized, and thus it is preferable.

[Hardening Agent]

The low refractive index layer of the present invention may contain a hardening agent. This is because the hardening agent reacts with silanol modified polyvinyl alcohol and can form a hydrogen bond network. When polyvinyl alcohol is used as the binder resin, the effect may be particularly exhibited.

In the present invention, the hardening agent that can be used with silanol modified polyvinyl alcohol and/or polyvinyl alcohol (unmodified polyvinyl alcohol) is not limited particularly, as long as it induces hardening reaction with polyvinyl alcohol; however, a hardening agent selected from the group consisting of boric acid, borate salt, and borax is preferably used. Well-known hardening agents other than boric acid, borate salt, and borax may be used. In general, a hardening agent is a compound having a group capable of reacting with polyvinyl alcohol or such a compound that promotes reaction between different groups possessed by polyvinyl alcohol, and such hardening agents are suitably selected and used. Specific examples of the hardening agents include an epoxy-based hardening agent (such as diglycidyl ethyl ether, ethylene glycol diglycidyl ether, 1,4-butanediol diglycidyl ether, 1,6-diglycidyl cyclohexane, N,N-diglycidyl-4-glycidyl oxyaniline, sorbitol polyglycidyl ether, and glycerol polyglycidyl ether), an aldehyde-based hardening agent (such as formaldehyde and glyoxal), an active halogen-based hardening agent (such as 2,4-dichloro-4-hydroxy-1,3,5-s-triazine), an active vinyl-based compound (such as 1,3,5-tris(acryloyl)-hexahydro-s-triazine and bis(vinylsulfonyl)methyl ether), and aluminum alum.

Boric acid and salts thereof refer to oxygen acid having a boron atom as the central atom and salts thereof, and specifically include orthoboric acid, diboric acid, metaboric acid, tetraboric acid, pentaboric acid, and octaboric acid, and salts thereof.

Borax is a mineral represented by $Na_2B_4O_5(OH)_4 \cdot 8H_2O$ (decahydrate of sodium tetraborate $Na_2B_4O_7$).

Boric acid having boron atoms as the hardening agents, borate salt, and borax may be used alone as an aqueous solution or in mixture of two or more kinds. Particularly preferred is a mixed aqueous solution of boric acid and borax.

Although each aqueous solution of boric acid and borax can only be added with a relatively dilute aqueous solution, a concentrated aqueous solution can be obtained by mixing both the aqueous solutions, and a coating liquid can be concentrated. Further, it is advantageous in terms of capable of relatively freely controlling pH of an aqueous solution to be added.

In the present invention, it is preferable for obtaining the effects of the present invention that boric acid, salts thereof, and/or borax is used. Namely, in this invention, at least one of the low refractive index layer and the high refractive index layer preferably contains at least one or more kinds of boron compounds selected from the group consisting of boric acid, borate salt, and borax. When boric acid, salts thereof, and/or borax is used, it is considered that a hydrogen bond network between the metal oxide particle and an OH group of polyvinyl alcohol as an aqueous binder resin is formed so that the inter-layer mixture between the high refractive index layer and the low refractive index layer is suppressed, preferred infrared shielding properties are achieved. In particular, a multilayer of the high refractive index layers and the low refractive index layers is coated by coater, and then a film-surface temperature of a coating film is temporarily lowered to approximately 15° C.; thereafter, when a set-based coating process for drying the film surface is used, the effects can be more preferably exhibited.

The total used amount of the above hardening agent is preferably 1 to 600 mg, more preferably 100 to 600 mg per 1 g of silanol modified polyvinyl alcohol. When polyvinyl alcohol is used as a binder resin, the hardening agent is used in an amount relative to the total amount of silanol modified polyvinyl alcohol and the binder resin (polyvinyl alcohol).

[Emulsion Resin]

The low refractive index layer of the present invention may further contain an emulsion resin. When the low refractive index layer contains the emulsion resin, the film flexibility is enhanced, and workability such as application onto glass is improved.

The emulsion resin is a resin in which fine resin particles, for example, particles having an average particle diameter of approximately 0.01 to 2.0 μm are dispersed in an aqueous medium in an emulsion state and is obtained by emulsion-polymerizing an oil soluble monomer, using a polymer dispersant having a hydroxyl group. The polymer components of emulsion resins to be obtained are basically the same regardless of kinds of dispersants to be used. Examples of the dispersant used in the polymerization of emulsion include low-molecular dispersants such as alkylsulfonate, alkylbenzenesulfonate, diethylamine, ethylene diamine, and quaternary ammonium salt and polymer dispersants such as polyoxyethylene nonyl phenyl ether, polyoxyethylene laurate ether, hydroxyethyl cellulose, and polyvinylpyrrolidone. When emulsion polymerization is performed by using the polymer dispersant having a hydroxyl group, the presence of the hydroxyl group is presumed on at least a surface of a fine particle, and chemical and physical properties of emulsion are different from those of emulsion resins polymerized by using other dispersants.

The polymer dispersant containing a hydroxyl group is a dispersant of a polymer whose weight average molecular weight is not less than 10,000, and the hydroxyl group is substituted in the side chain or at the end. Examples of the polymer dispersant include a polymer dispersant which is an acrylic group polymer such as sodium polyacrylate and polyacrylamide and is copolymerized with 2-ethylhexyl acrylate, polyether such as polyethylene glycol and polypropylene glycol, and polyvinyl alcohol, polyvinyl alcohol is particularly preferred.

Polyvinyl alcohol used as a polymer dispersant include a usual polyvinyl alcohol obtained by hydrolyzing polyvinyl acetate and modified polyvinyl alcohol such as cation modified polyvinyl alcohol, anion modified polyvinyl alcohol having an anionic group such as a carboxyl group, and modified polyvinyl alcohol such as silyl modified polyvinyl alcohol having a silyl group. In polyvinyl alcohol, the higher the average polymerization degree, the greater the effect of suppressing occurrence of cracks in the formation of an ink absorbing layer; however, when the average polymerization degree is within 5,000, the viscosity of an emulsion resin is not high, the polyvinyl alcohol is easily handled at the time of manufacturing. Accordingly, polyvinyl alcohol having an average polymerization degree of 300 to 5,000 is preferred, polyvinyl alcohol having an average polymerization degree of 1,500 to 5,000 is more preferred, and polyvinyl alcohol having an average polymerization degree of 3000 to 4500 is particularly preferred. The saponification degree of polyvinyl alcohol is preferably 70 to 100 mol %, more preferably 80 to 99.5 mol %.

Examples of resins emulsion polymerized with the above polymer dispersant include an ethylenic monomer such as acrylic acid ester, methacrylic acid ester, a vinyl-based compound, and a styrene-based compound and a homopolymer or a copolymer of a diene-based compound such as butadiene or isoprene and further include an acrylic resin, a styrene-butadiene-based resin, and an ethylene-vinyl acetate-based resin.

[Other Additives]

The low refractive index layer further may contain various well-known additives such as ultraviolet absorbers described in Japanese Patent Application Laid-Open Nos. S57-74193, S57-87988, and S62-261476, anti-fading additives described in Japanese Patent Application Laid-Open Nos. S57-74192, S57-87989, S60-72785, S61-146591, H1-95091, and H3-13376, various kinds of surfactants such as anion, cation, and nonion, fluorescent brightening agents described in Japanese Patent Application Laid-Open Nos. S59-42993, S59-52689, S62-280069, S61-242871, and H4-219266, pH regulators such as sulfuric acid, phosphoric acid, acetic acid, citric acid, sodium hydroxide, potassium hydroxide, and potassium carbonate, antifoaming agents, lubricant agents such as diethylene glycol, antiseptic agents, antistatic agents, and matting agents.

[High Refractive Index Layer]

In the present invention, the high refractive index layer preferably contains second metal oxide particles or a binder resin and more preferably contains the second metal oxide particles and the binder resin. In this invention, the high refractive index layer may further contain various other additives such as protective agent, a hardening agent, and an emulsion resin.

In the present invention, the high refractive index layer preferably contains silanol modified polyvinyl alcohol. Although silanol modified polyvinyl alcohol used in the high refractive index layer and silanol modified polyvinyl alcohol used in the low refractive index layer may be the same or different, when silanol modified polyvinyl alcohol is used in both the high refractive index layer and the low refractive index layer, the haze is improved to enhance the film transparency, and thus it is preferable. When the high refractive index layer and the low refractive index layer contain the same silanol modified polyvinyl alcohol, the coatability is improved, and thus it is preferable. As silanol modified polyvinyl alcohol that can be contained in the high refractive index layer, silanol modified polyvinyl alcohol similar to one used in the low refractive index layer is employed.

When the high refractive index layer contains silanol modified polyvinyl alcohol, the content is preferably 1 to 40% by mass, more preferably 2 to 30% by mass, particularly preferably 3 to 25% by mass, based on 100% by mass of the total solid content of the high refractive index layer. When the content of silanol modified polyvinyl alcohol is not less than 1% by mass, the setting properties are improved; therefore, a film is less likely to be disturbed, and the haze is improved. When the content of silanol modified polyvinyl alcohol is not more than 40% by mass, the liquid stability is good, and thus it is preferable.

[Second Metal Oxide Particle]

The high refractive index layer of the present invention preferably contains second metal oxide particles. The second metal oxide particles which can be contained in the high refractive index layer are preferably different from the metal oxide particles contained in the low refractive index layer.

Examples of the metal oxide particles used in the high refractive index layer include titanium oxide, zirconium oxide, zinc oxide, alumina, colloidal alumina, niobium oxide, europium oxide, and zircon. In the present invention, in order to adjust the refractive index, one of the second metal oxide particle may be used, or two or more thereof may be used together.

In the present invention, in order to form a transparent high refractive index layer having a higher refractive index, the high refractive index layer preferably contains metal oxide particles having a high refractive index, such as titanium oxide and zirconia, that is, titanium oxide particles and zirconia particles. Although both rutile type (tetragonal type) titanium oxide and anatase type titanium dioxide may be used as the titanium oxide particle, the high refractive index layer preferably contains rutile type (tetragonal type) titanium oxide particles and more preferably contains rutile type (tetragonal type) titanium oxide particles having a volume average particle diameter of not more than 100 nm. Furthermore, the high refractive index layer may contain plural kinds of titanium oxide particles.

It is preferable that the first metal oxide particles contained in the low refractive index layer and the second metal oxide particles contained in the high refractive index layer are in such a state that the ionicities are made uniform (namely, the electric charges are the same sign). For example, when simultaneous multi-layer coating is carried out, if the ionicities are different, reaction occurs at an interface to form an aggregate and, thus, to deteriorate the haze. As means for making uniform the ionicities, for example when silicon dioxide (anion) is used in the low refractive index layer and titanium oxide (cation) is used in the high refractive index layer, silicon dioxide can be treated with aluminum or the like to be cationized, or, as described later, titanium oxide can be treated with silicon-containing hydrated oxide to be anionized.

An average particle diameter (average of the number) of the second metal oxide particles contained in the high refractive index layer of the present invention is preferably 3 to 100 nm, more preferably 3 to 50 nm.

The content of the metal oxide particles in the high refractive index layer is preferably 15 to 85% by mass, more preferably 20 to 80% by mass, still more preferably 30 to 75% by mass, based on 100% by mass of the total solid content of the high refractive index layer. When the content of the metal oxide particles is within the above range, an infrared shielding film having good infrared shielding properties can be obtained.

As the titanium oxide particles of the present invention, it is preferable to use titanium oxide particles in a state of capable of being dispersed in an organic solvent or the like while modifying a surface of an aqueous titanium oxide sol.

As methods of preparing the aqueous titanium oxide sol, it is possible to refer to the matters described in Japanese Patent Application Laid-Open Nos. S63-17221, H7-819, H9-165218, H11-43327, S63-17221, and so on.

When the titanium oxide particles are used as the second metal oxide particles, as other processes for producing the titanium oxide particles, "Titanium Oxide—physicality and applied technology," Manabu SEINO, p 255 to 258 (2000), Gihodo Shuppan Co., Ltd. and a method of a process (2) described in paragraphs 0011 to 0023 of the specification of WO 2007/039953 can be referred to, for example.

The production process according to the process (2) includes a process (1) in which a titanium dioxide hydrate is treated with at least one kind of basic compounds selected from the group consisting of a hydroxide of alkali metal or a hydroxide of alkaline earth metal and the process (2) in which an obtained titanium dioxide dispersed substance is treated with a carboxylic acid group-containing compound and inorganic acid after the process (1).

The second metal oxide particle of the present invention is preferably in the form of a core-shell particle in which a titanium oxide particle is coated with silicon-containing hydrated oxide. In the core-shell particle, the volume average particle diameter of a titanium oxide particle as a core portion is preferably more than 1 nm and less than 30 nm, more preferably not less than 4 nm and less than 30 nm, and the core-shell particle is configured that a surface of the titanium oxide particle is coated with a shell composed of the silicon-containing hydrated oxide so that a coating amount of the silicon-containing hydrated oxide as $SiO_2$ is 3 to 30% by mass, based on 100% by mass of titanium oxide as a core. In the present invention, when the core-shell particles are contained as the second metal oxide particles, the effect of suppressing the inter-layer mixture between the high refractive index layer and the low refractive index layer is provided by the interaction between the silicon-containing hydrated oxide and the binder resin.

The silicon-containing hydrated oxide in this specification may be a hydrate of an inorganic silicon compound or a hydrolysate and/or a condensate of an organic silicon compound, and in order to obtain the effects of the present invention, the silicon-containing hydrated oxide more preferably has a silanol group. Thus, in this invention, the second metal oxide particle is preferably a silica-modified (silanol-modified) titanium oxide particle prepared by silica-modifying the titanium oxide particle.

The coating amount of titanium oxide with the silicon-containing hydrated compound is 3 to 30% by mass, preferably 3 to 10% by mass, more preferably 3 to 8% by mass, based on 100% by mass of titanium oxide. This is because when the coating amount is not more than 30% by mass, the high refractive index layer has a desired refractive index, and when the coating amount is not less than 3% by mass, a particle can be stably formed.

As the second metal oxide particle of the present invention, a core-shell particle produced by a well-known process may be used. For example, there are exemplified core-shell particles produced by the following methods (i) to (iv): (i) the method in which an aqueous solution containing titanium oxide particles is heated and hydrolyzed, or alkali is added to the aqueous solution containing titanium oxide particles and neutralized, and titanium oxide having an average particle diameter of 1 to 30 nm is obtained. Then, a slurry in which a titanium oxide particle and mineral acid are mixed so that the titanium oxide particle/mineral acid is within a range of 1/0.5 to 1/2 is heat-treated at a temperature of not less than 50° C. and not more than a boiling point of the slurry. Thereafter, the obtained slurry containing the titanium oxide particle is added with a silicon compound (for example, sodium silicate aqueous solution, a hydrated oxide of silicon is precipitated on a surface of the titanium oxide particle, the surface is treated, and then impurities are removed from the slurry of the obtained surface-treated titanium oxide particle (Japanese Patent Application Laid-Open No. 10-158015); (ii) the method in which a titanium oxide sol stabilized at a pH of an acidic region obtained by deflocculating titanium oxide such as aqueous titanium oxide with monobasic acid or salts thereof and alkyl silicate as a dispersion stabilizer are mixed by an ordinary method and neutralized (Japanese Patent Application Laid-Open No. 2000-053421); (iii) hydrogen peroxide and metallic tin are simultaneously or alternately added to a mixed aqueous solution of titanium salt (such as titanium tetrachloride) and so on while maintaining a $H_2O_2/Sn$ molar ratio of 2 to 3, a titanium-containing aqueous solution of a basic salt is produced, the aqueous solution of a basic salt is held at a temperature of 50 to 100° C. for 0.1 to 100 hours to produce an aggregate of a composite colloid containing titanium oxide, an electrolyte in the aggregate slurry is then removed, and a stable aqueous sol of composite colloidal particles containing titanium oxide is produced. Meanwhile, an aqueous solution containing silicate (such as a sodium silicate aqueous solution) and soon is prepared, and cations existing in the aqueous solution is removed, whereby a stable aqueous sol of composite colloidal particles containing silicon dioxide is produced. 100 parts by mass of an obtained composite aqueous sol containing titanium oxide in terms of metal oxide $TiO_2$ is mixed with 2 to 100 parts by mass of an obtained composite aqueous sol containing silicon dioxide in terms of $SiO_2$, anions are removed, and heat aging is carried out at 80° C. for 1 hour (Japanese Patent Application Laid-Open No. 2000-063119); (iv) the method in which hydrous titanic acid is dissolved by adding hydrogen peroxide to a gel or sol of the hydrous titanic acid, a silicon compound and so on are added to an obtained peroxotitanic acid aqueous solution and heated, a dispersion liquid of core particles composed of composite solid solution oxide having a rutile type structure is obtained, a silicon compound and so on are subsequently added to the dispersion liquid of core particles and thereafter heated to form a coating layer on a surface of the core particle, and, thus, to obtain a sol with dispersed composite oxide particles, and heating is further performed (Japanese Patent Application Laid-Open No. 2000-204301); and (v) the method in which a hydrosol obtained by deflocculating hydrous titanium oxide is added with a compound as a stabilizer selected from organoalkoxysilane ($R^1nSiX_{4-n}$) or hydrogen peroxide and aliphatic or aromatic hydroxycarboxylic acid, a pH of a solution is adjusted to not less than 3 and less than 9, the solution is aged, and then desalting treatment is performed (Japanese Patent Application Laid-Open No. 4550753).

The core-shell particle according to the present invention may be ones in which the entire surface of a titanium oxide particle as a core is coated with a silicon-containing hydrated oxide or ones in which a portion of the surface of the titanium oxide particle as a core is coated with the silicon-containing hydrated oxide.

[Binder Resin]

In an infrared shielding film of the present invention, the high refractive index layer preferably contains a binder resin and more preferably contains a water-soluble binder resin. This is because a stable coating liquid can be prepared by using the water-soluble binder resin. At least one of the high refractive index layers preferably contains polyvinyl alcohol as the binder resin. Water-soluble binder resin used in the high refractive index layer and water-soluble binder resin used in the low refractive index layer may be the same or different.

As the binder resin used in the high refractive index layer, a similar one used in the low refractive index layer is employed, and therefore, a description thereof will be omitted here.

The content of the binder resin in the high refractive index layer is preferably 3 to 70% by mass, more preferably 5 to 60% by mass, still more preferably 10 to 50% by mass, particularly preferably 15 to 45% by mass, based on 100% by mass of the total solid content of the high refractive index layer.

[Protective Agent]

In one embodiment of the present invention, the high refractive index layer preferably contains at least two kinds of water-soluble resins. In this case, it is preferable that at least one kind coats (or protects) the second metal oxide particle, and another kind functions as a binder resin. The water-soluble resin coating the second metal oxide particle is referred to as a "protective agent."

As the protective agent, one similar to that described in the description of the low refractive index layer can be used.

In the present invention, the protective agent is contained in a range of preferably 0.1 to 30% by mass, more preferably 0.5 to 20% by mass, still more preferably 1 to 10% by mass, based on 100% by mass of a metal oxide particle. When the protective agent is contained in the above range, a coating liquid for the high refractive index layer has excellent liquid stability, so that the coatability is stabilized, and thus it is preferable.

[Hardening Agent]

The high refractive index layer of the present invention may contain a hardening agent. This is because when polyvinyl alcohol is used as a binder resin, the hardening agent reacts with polyvinyl alcohol and can form a hydrogen bond network. Since the hardening agent used in the high refractive index layer is similar to that used in the low refractive index layer, a description thereof will be omitted here. When polyvinyl alcohol is used as the binder resin, the effect may be particularly exhibited.

The total used amount of the hardening agent in the high refractive index layer is preferably 1 to 600 mg, more preferably 100 to 600 mg per 1 g of polyvinyl alcohol. When silanol modified polyvinyl alcohol is used, the hardening agent is used in an amount relative to the total amount of silanol modified polyvinyl alcohol and the binder resin (polyvinyl alcohol).

[Emulsion Resin and Other Additives]

The high refractive index layer of the present invention may contain an emulsion resin and other additives. Since the emulsion resin and other additives used in the high refractive index layer are similar to those used in the low refractive index layer, descriptions thereof will be omitted here.

[Substrate]

A substrate used in the infrared shielding film of the present invention is not limited particularly as long as it is formed of a transparent organic material.

Examples of such a substrate include a film formed of a resin such as methacrylic acid ester, polyethylene terephthalate (PET), polyethylene naphthalate (PEN), polycarbonate (PC), polyarylate, polystyrene (PS), aromatic polyamide, polyether ether ketone, polysulphone, polyether sulfone, polyimide, and polyetherimide and a resin film formed by stacking two or more the above resins. In terms of cost and easiness of availability, polyethylene terephthalate (PET), polyethylene naphthalate (PEN), polycarbonate (PC), and so on are preferably used.

The substrate preferably has a thickness of approximately 5 to 200 μm, more preferably 15 to 150 μm. Two or more substrates may be superimposed, and in this case, the kinds of the substrates may be the same or different.

In the substrate, the transmittance in a visible light region shown in JIS R3106-1998 is not less than 85%, preferably not less than 90%. When the transmittance of the substrate is not less than the above value, it is advantageous in that the transmittance in the visible light region shown in JIS R3106-1998 when the substrate is formed into the infrared shielding film is not less than 50%, and thus it is preferable.

The substrate using the above resin and so on may be an unstretched film or a stretched film. The substrate is preferably the stretched film in terms of enhancement of the strength and suppression of heat expansion.

The substrate can be manufactured by a conventional well-known general method. For example, a resin as a material is melted by an extruder to be extruded through an annular die or a T die, and, thus, to be rapidly cooled, whereby a substantially amorphous and not-oriented unstretched substrate can be manufactured. The stretched substrate can be manufactured by stretching the unstretched substrate in a flowing (longitudinal axis) direction of the substrate or a perpendicular (lateral axis) direction to the flowing direction of the substrate by a well-known method such as uniaxial stretching, tenter type sequential biaxial stretching, tenter type simultaneous biaxial stretching, and tubular simultaneous biaxial stretching. Although the stretching magnification in this case can be appropriately selected according to a resin as a raw material of the substrate, it is preferably 2 to 10 times in each of the longitudinal axis direction and the lateral axis direction.

The substrate may be subjected to relaxation treatment and off-line heat treatment in terms of dimension stability. It is preferable that the relaxation treatment is carried out during a process of performing thermal fixing during a stretching film-forming process of the above polyester film and then rewinding the film in a horizontal stretching tenter or the film from the tenter. The relaxation treatment is preferably carried out at a treatment temperature of 80 to 200° C., more preferably 100 to 180° C. Further, the relaxation treatment is preferably carried out at a relaxation ratio of 0.1 to 10%, more preferably 2 to 6%. When the substrate subjected to the relaxation treatment is subjected to the following off-line heat treatment, the thermal resistance is enhanced, and in addition, the dimension stability is good.

In the substrate, it is preferable that an undercoat layer coating liquid is coated in-line onto one side or both sides of the substrate in a film-formation process. In the present invention, undercoat coating in the film-formation process is referred to as in-line undercoat. Examples of resins used in the undercoat layer coating liquid usable for this invention include polyester resin, acrylic-modified polyester resin, polyurethane resin, acrylic resin, vinyl resin, vinylidene chloride resin, polyethylene imine vinylidene resin, polyethylene imine resin, polyvinyl alcohol resin, modified polyvinyl alcohol resin, and gelatin, and all of the above resins can be preferably used. Those undercoat layers may be added with a conventional well-known additive. The above undercoat layer can be coated by a well-known method such as roll coating, gravure coating, knife coating, dip coating, and spray coating. The coated amount of the undercoat layer is preferably approximately 0.01 to 2 g/m$^2$ (dry state).

[Method of Manufacturing Infrared Shielding Film]

A method of manufacturing the infrared shielding film of the present invention is not limited particularly, and as long as at least one unit constituted of the high refractive index layer and the low refractive index layer can be formed on the substrate, any method may be used.

In the method of manufacturing the infrared shielding film of the present invention, the units constituted of the high refractive index layer and the low refractive index layer are stacked on the substrate and formed, and, for example, the coating liquid for the high refractive index layer and the coating liquid for the low refractive index layer are alternately coated and dried to form a laminate. Namely, the infrared shielding film is obtained by the method of manufacturing the infrared shielding film including a process of coating the coating liquid for the low refractive index layer containing the metal oxide particle, silanol modified polyvinyl alcohol, the binder resin, and an aqueous solvent and the coating liquid for the high refractive index layer containing the binder resin and the aqueous solvent onto the substrate and a process of drying the substrate coated with the coating liquids.

Specifically, it is preferable that the high refractive index layer and the low refractive index layer are alternately coated and dried to form the laminate. Specifically, the following configuration is exemplified: (1) a method of coating the coating liquid for the high refractive index layer onto the substrate, drying the coating liquid, forming the high refractive index layer, coating the coating liquid for the low refractive index layer onto the substrate after the formation of the high refractive index layer, drying the coating liquid, forming the low refractive index layer, and forming the infrared shielding film; (2) a method of coating the coating liquid for the low refractive index layer onto the substrate, drying the coating liquid, forming the low refractive index layer, coating the coating liquid for the high refractive index layer after the formation of the low refractive index layer, drying the coating liquid, forming the high refractive index layer, and forming the infrared shielding film; (3) a method of alternately sequentially multi-layer coating the coating liquid for the high refractive index layer and the coating liquid for the low refractive index layer onto the substrate, then drying the coating liquids, and forming the infrared shielding film including the high refractive index layer and the low refractive index layer; and (4) a method of simultaneously multi-layer coating the coating liquid for the high refractive index layer and the coating liquid for the low refractive index layer onto the substrate, drying the coating liquids, and forming the infrared shielding film including the high refractive index layer and the low refractive index layer. Among them, the method (4) as a simpler manufacturing process is preferred.

(Method of Preparing Coating Liquid)

First, a method of preparing the coating liquid for the high refractive index layer and the coating liquid for the low refractive index layer will be described.

The method of preparing the coating liquid for the high refractive index layer and the coating liquid for the low refractive index layer is not limited particularly, and, for example, there is a method of adding the metal oxide particles, the binder resin (containing modified polyvinyl alcohol in the case of the coating liquid for the low refractive index layer and containing modified polyvinyl alcohol in the case of the coating liquid for the high refractive index layer), and other additives to be added according to need and stirring and mixing. In this case, the order of adding each component is not limited particularly, and the components may be sequentially added and mixed while being stirred, or all the components may be added at a time and mixed while being stirred. According to need, a solvent is further used to prepare the coating liquid to have a suitable viscosity.

It is preferable to separately use the second metal oxide particle prepared in a state of a dispersion liquid before preparation of the coating liquid. Namely, it is preferable that the high refractive index layer is formed using a water-based coating liquid for the high refractive index layer prepared by adding and dispersing rutile type titanium oxide having a volume average particle diameter of not more than 100 nm. In the present invention, it is preferable that the high refractive index layer is formed by the above method, using a water-based coating liquid for the high refractive index layer prepared by adding and dispersing titanium oxide coated with silicon-containing hydrated oxide. When a dispersion liquid is used, the dispersion liquid may be appropriately added so that each layer has arbitrary concentration.

Although a solvent used for preparing the high refractive index layer and the low refractive index layer is not limited particularly, water, an organic solvent, or a mixed solvent of them is preferred.

Examples of the organic solvent include alcohols such as methanol, ethanol, 2-propanol, and 1-butanol, esters such as ethyl acetate, butyl acetate, propylene glycol monomethyl ether acetate, and propylene glycol monoethyl ether acetate, ethers such as diethyl ether, propylene glycol monomethyl ether, and ethylene glycol monoethyl ether, amides such as dimethylformamide and N-methylpyrrolidone, and ketones such as acetone, methyl ethyl ketone, acetylacetone, and cyclohexanone. One of those organic solvents or a mixture of two or more thereof may be used. As the solvent of the coating liquid, water is particularly preferred from an environmental aspect and simplicity of operation, and a mixed solvent of water and methanol, ethanol, or ethyl acetate is preferred, and water is particularly preferred.

As the coating liquid for the low refractive index layer and the coating liquid for the high refractive index layer, it is preferable to use a water-based coating liquid mainly composed of a water-soluble resin such as polyvinyl alcohol and water or an aqueous solvent containing water and a water-soluble organic solvent because an inter-layer mixture can be suppressed by setting a coating after coating the coating liquids.

The concentration of the binder resin in the coating liquid for the high refractive index layer is preferably 0.5 to 10% by mass. The concentration of the metal oxide particles in the coating liquid for the high refractive index layer is preferably 1 to 50% by mass.

The concentration of the binder resin in the coating liquid for the low refractive index layer is preferably 0.5 to 10% by mass. The concentration of the metal oxide particles in the coating liquid for the low refractive index layer is preferably 1 to 50% by mass. The concentration of modified polyvinyl alcohol in the coating liquid for the low refractive index layer is preferably 0.1 to 10% by mass.

The viscosity of the coating liquid for the high refractive index layer and the coating liquid for the low refractive index layer in the simultaneous multi-layer coating is preferably within a range of 5 to 100 mPa·s at 45° C. when a slide-bead coating method is used, more preferably within a range of 10 to 50 mPa·s. When a curtain coating method is used, the viscosity at 45° C. is preferably within a range of 5 to 1200 mPa·s, more preferably within a range of 25 to 500 mPa·s.

The viscosity of the coating liquid at 15° C. is preferably not less than 100 mPa·s, more preferably 100 to 30,000 mPa·s, still more preferably 3,000 to 30,000 mPa·s, most preferably 10,000 to 30,000 mPa·s.

As a coating and drying method, the coating liquid for the high refractive index layer and the coating liquid for the low refractive index layer are heated to not less than 30° C. and coated. After that, the temperature of the formed coating is temporarily reduced to 1 to 15° C., and it is preferable that the coating is dried at not less than 10° C. As a more preferable drying condition, the coating is dried under conditions that a wet-bulb temperature is 5 to 50° C. and a film surface temperature is 10 to 50° C. As a cooling method used immediately after coating, it is preferable that the coating is cooled by a horizontal set method in terms of uniformity of the formed coating.

As a coating method, a roll coating method, a rod bar coating method, an air knife coating method, a spray coating method, a curtain coating method, a slide bead coating method using a hopper described in U.S. Pat. Nos. 2,761,419 and 2,761,791, and an extrusion coating method are preferably used, for example.

(Coating and Drying Method)

The conditions of the coating and drying methods are not limited particularly; however, in a sequential coating method, for example, any one of the coating liquid for the high refractive index layer and the coating liquid for the low refractive index layer heated to 30 to 60° C. is first coated onto the substrate to be dried, and, thus, to form a layer, and after that, the other coating liquid is coated onto this layer to be dried, and, thus, to form a stacked film precursor (unit). Next, the coating liquids are sequentially coated by the above method to be dried, and, thus, to be stacked as layers, whereby the units of the number required for exhibiting a desired infrared shielding performance are formed to obtain the stacked film precursors. In the drying, it is preferable that the formed coating is dried at not less than 30° C. For example, the coating is dried under conditions that the wet-bulb temperature is 5 to 50° C. and the film surface temperature is 30 to 100° C. (preferably 10 to 50° C.), and, for example, hot air of 40 to 60° C. is blown against the coating for 1 to 5 seconds to dry the coating. As the drying method, hot air drying, infrared drying, and microwave drying are used. Drying in a multi-stage process is more preferable than drying in a single process, and it is more preferable that a temperature of a constant rate drying portion <a temperature of a falling rate drying. In this case, a temperature range of the constant rate drying portion is preferably 30 to 60° C., and a temperature range of the falling rate drying portion is preferably 50 to 100° C.

As the conditions of the coating and drying method in the simultaneous multi-layer coating, the coating liquid for the high refractive index layer and the coating liquid for the low refractive index layer are heated to 30 to 60° C., and the simultaneous multi-layer coating of the coating liquid for the high refractive index layer and the coating liquid for the low refractive index layer onto the substrate is performed. After that, the temperature of the formed coating is temporarily reduced (set) to 1 to 15° C., and it is preferable that the coating is then dried at not less than 10° C. More preferable drying conditions are conditions that the wet-bulb temperature is 5 to 50° C. and the film surface temperature is 10 to 50° C. For example, hot air of 80° C. is blown against the coating for 1 to 5 seconds to dry the coating. As a cooling method used immediately after coating, it is preferable that the coating is cooled by the horizontal set method in terms of enhancement of the uniformity of the formed coating.

The above "set" means a process in which cooling air or the like is applied to a coating to reduce the temperature of the coating and thereby to enhance the viscosity of a coating composition, whereby flowability of materials between layers and in each layer is lowered or gelated. A state in which cooling air is applied to a coating film from a surface, and when a finger is pressed against a surface of the coating film, nothing is adhered to the finger is defined as a state in which set is completed.

The time (set time) from the time point of coating to the completion of setting after the application of cooling air is preferably within 5 minutes, more preferably within 2 minutes. Although the lower limit time is not limited particularly, not less than 45 seconds are preferred. If the set time is too short, mixing of components in a layer may be insufficient. Meanwhile, if the set time is too long, interlayer diffusion of metal oxide fine particles progresses, and the refractive index difference between the high refractive index layer and the low refractive index layer may be insufficient. If the elasticity of an inner layer between the high refractive index layer and the low refractive index layer quickly increases to high level, the process of performing set is not required to be provided.

The set time can be adjusted by adjusting the concentration of water-soluble polymer (binder resin) and the concentration of metal oxide particles or by adding other components such as various types of well-known gelling agents such as gelatin, pectine, agar-agar, carrageenan, and gellan gum.

The temperature of the cooling air is preferably 0 to 25° C., more preferably 5 to 10° C. Although a time for which a coating is exposed to the cooling air depends on a speed of conveying the coating, the time is preferably 10 to 360 seconds, more preferably 10 to 300 seconds, still more preferably 10 to 120 seconds.

The coating liquid for the high refractive index layer and the coating liquid for the low refractive index layer may be coated so that the coating thickness is the preferred thickness at the time of drying as shown above.

[Infrared Shielding Body]

The infrared shielding film provided by the present invention can be applied in a wide application field. For example, the infrared shielding film is applied on to equipment exposed to sunlight for a long period of time, such as outdoor sides of windows of a building and windows of a vehicle and is used as a film for window, such as an infrared shielding film giving an infrared shielding effect, a film for agricultural greenhouse, and so on primarily in order to enhance weather resistance.

Particularly, the infrared shielding film according to the present invention is suitable for a member in which the infrared shielding film is applied directly onto a base structure such as glass and resin as a glass substitute or applied thereonto through an adhesive.

Namely, still another embodiment of the present invention provides an infrared shielding body in which the infrared shielding film according to this invention (optical laminate film) is provided on at least one side of a base structure.

Specific examples of the above base structure include glass, polycarbonate resin, polysulfone resin, acrylic resin, polyolefin resin, polyether resin, polyester resin, polyamide resin, polysulfide resin, unsaturated polyester resin, epoxy resin, melamine resin, phenol resin, diallyl phthalate resin, polyimide resin, urethane resin, polyvinyl acetate resin, polyvinyl alcohol resin, styrene resin, vinyl chloride resin, a metal plate, and ceramics. As the kind of resin, any of thermoplastic resin, thermosetting resin, and ionizing radiation curable resin can be used, and two or more kinds of these resins may be used in combination. The base structure which can be used in the present invention can be manufactured by a well-known method such as extrusion molding, calendar molding, injection molding, hollow molding, and compression molding. Although the thickness of the base structure is not limited particularly, it is usually 0.1 mm to 5 cm.

In an adhesive layer or a sticking layer through which the infrared shielding film is applied onto the base structure, it is preferable that the infrared shielding film is installed on a sunlight (heat ray) incident surface side. When the infrared shielding film according to the present invention is held between a window glass and the base structure, sealing against surrounding gas such as moisture is enabled, an excellent durability is obtained, and thus, it is preferable. Even if the infrared shielding film according to this invention is installed outdoor or outside a vehicle (a film to be applied outside), there is an environmental durability, and thus, it is preferable.

As an adhesive applicable to the present invention, an adhesive mainly composed of a photocurable resin or a thermosetting resin can be used.

An adhesive having durability against ultraviolet rays is preferred, and an acrylic adhesive or a silicone-based adhesive is preferred. Particularly, the acrylic adhesive is preferred in terms of adhesive characteristics and cost. In the acrylic adhesive, a solvent-based adhesive is preferred. When a solution polymerization polymer is used as an acrylic solvent-based adhesive, a well-known monomer can be used as a monomer thereof.

A polyvinyl butyral resin used as an intermediate layer of a laminated glass or an ethylene-vinyl acetate copolymer-based resin may be used. Specifically, there are plastic polyvinyl butyral (produced by Sekisui chemical Co., Ltd. or Mitsubishi Monsanto Co.), an ethylene-vinylacetate copolymer (produced by Du Pont, Takeda Pharmaceutical Company Limited, or Duramine), a modified ethylene-vinylacetate copolymer (produced by TOSOH CORPORATION, or Melthene G), and so on. An ultraviolet absorber, an antioxidant agent, an antistatic agent, a heat stabilizer, a lubricant, a filler, a colorant, an adhesion adjusting agent, and so on may be suitably added and blended in the adhesive layer.

The thermal insulation performance and the solar radiation heat shielding performance of the infrared shielding film or the infrared shielding body can be generally determined by methods based on JIS R 3209-1998 (multiple glass), JIS R 3106-1998 (testing method of transmittance, reflectance, emissivity, and solar radiation heat acquisition rate of sheet glasses), and JIS R 3107-1998 (method of calculating thermal resistance of sheet glasses and heat insulation property in architecture).

In the measurement of solar transmittance, solar reflectance, emissivity, and visible light transmittance, (1) spectral transmittance and spectral reflectance of various single plate glasses are measured using a wavelength (300 to 2500 nm) spectrophotometer. Further, the emissivity is measured using a spectrophotometer at a wavelength of 5.5 to 50 μm. As each emissivity of float plate glass, polished plate glass, figured glass, and heat-absorbing plate glass, default values are used. (2) In the calculation of the solar transmittance, the solar reflectance, solar absorptance, and modified emissivity, the solar transmittance, the solar reflectance, the solar absorptance, and normal emissivity are calculated in accordance with JIS R 3106-1998. The modified emissivity is calculated by multiplying the normal emissivity by a coefficient shown in JIS R3107-1998. In the calculation of thermal insulation properties and solar radiation heat shielding properties, (1) thermal resistance of multiple glass is calculated in accordance with JIS R 3209-1998, using a measured value of thickness and the modified emissivity. However, when the thickness of a hollow layer is more than 2 mm, the gas thermal conductance of the hollow layer is obtained in accordance with JIS R 3107-1998. (2) The thermal insulation properties are obtained with resistance of heat transmission by adding heat transfer resistance to the thermal resistance of the multiple glass. (3) In the calculation of solar radiation heat shielding properties, a solar radiation heat acquisition rate is obtained by JIS R 3106-1998 and subtracted from 1.

EXAMPLES

Hereinafter, the present invention is described specifically by referring to examples, however, the present invention is not limited to them. In the Examples, the term "parts" or "%" is used. Unless particularly mentioned, this represents "parts by weight" or "% by weight."

<<Production of Infrared Shielding Film>>

Example 1

(Preparation of Coating Liquid L1 for Low Refractive Index Layer)

Preparation of Silicon Dioxide Aqueous Dispersion Liquid 30 parts of 4.0%-by-mass aqueous solution of polyvinyl alcohol (saponification degree: 98.0 to 99.0 mol %, polymerization degree: 300, PVA103, produced by Kuraray Co., Ltd.) and 150 parts of 3.0%-by-mass aqueous solution of boric acid were mixed with 650 parts of 10%-by-mass aqueous solution of colloidal silica (particle diameter (volume average) 4 to 6 nm, produced by Nissan Chemical Industries, Ltd.; Snow tex OXS). After that, the mixture was finished to 1000 parts with purified water, and a silicon dioxide dispersion liquid L1 was prepared.

Subsequently, the dispersion liquid L1 was heated to 45° C., and while the dispersion liquid L1 was stirred, 760 parts of 4.0%-by-mass aqueous solution of silanol modified polyvinyl alcohol (saponification degree of polyvinyl alcohol: 98 to 99%, polymerization degree: 1700, PVA-R1130, produced by Kuraray Co., Ltd.) was sequentially added. After that, 40 parts of 1%-by-mass aqueous solution of an anionic surfactant (Rapisol A30 produced by NOF CORPORATION) was added to prepare a coating liquid L1 for the low refractive index layer.

(Preparation of Coating Liquid H1 for High Refractive Index Layer)

30 L (liter) of aqueous sodium hydroxide (concentration 10 mol/L) was added under stirring to 10 L of an aqueous suspension (TiO concentration 100 g/L) obtained by suspending titanium dioxide hydrate in water, temperature was increased to 90° C., and the solution was aged for 5 hours. After that, neutralization with hydrochloric acid, filtration, and water washing were carried out. In the above reaction (treatment), the titanium dioxide hydrate obtained by thermally hydrolyzing a titanium oxysulfate aqueous solution in accordance with a well-known method was used.

A base-treated titanium compound was suspended in purified water so that a TiO$_2$ concentration was 20 g/L, and 0.4 mol % of citric acid under stirring was added relative to the amount of TiO$_2$, and a temperature of the liquid was increased. Once a liquid temperature was increased to 95° C., concentrated hydrochloric acid was added so that the concentration of hydrochloric acid was 30 g/L, and the liquid was stirred for 3 hours while maintaining the liquid temperature.

When pH and a zeta potential of an obtained titanium oxide sol aqueous dispersion liquid were measured, pH was 1.4, and the zeta potential was +40 mV. When the particle diameter was measured by Zetasizer nano manufactured by Malvern Instruments Ltd, the volume average particle diameter was 35 nm, and a degree of monodispersity was 16%.

1 kg of purified water was added to 1 kg of 20.0%-by-mass titanium oxide sol aqueous dispersion liquid containing rutile type titanium oxide particles having a volume average particle diameter of 10 nm.

Preparation of Sodium Silicate Aqueous Solution

A sodium silicate aqueous solution whose SiO$_2$ concentration was 2.0% by mass was prepared.

Preparation of Silica-Modified Titanium Oxide Particles 2 kg of purified water was added to 0.5 kg of the above 10.0%-by-mass titanium oxide sol aqueous dispersion liquid and heated to 90° C. After that, 1.3 kg of 2.0%-by-mass sodium silicate aqueous solution was gradually added, and then an obtained dispersion liquid was heat-treated at 175° C. for 18 hours in an autoclave and further concentrated to obtain 20%-by-mass sol aqueous dispersion liquid of silica-modified titanium oxide particles in which titanium oxide had a rutile type structure, and a covering layer was SiO$_2$.

28.9 parts of the obtained 20.0%-by-mass sol aqueous dispersion liquid of silica-modified titanium oxide particles, 10.5 parts of 1.92%-by-mass citric acid aqueous solution, 2.0 parts of 10%-by-mass polyvinyl alcohol (PVA103, produced by Kuraray Co., Ltd.), and 9.0 parts of 3%-by-mass boric acid aqueous solution were mixed to prepare a silica-modified titanium oxide particle dispersion liquid H1.

Subsequently, while the titanium oxide particle dispersion liquid H1 was stirred, 41.9 parts of 4.0%-by-mass polyvinyl alcohol (saponification degree: 87.0 to 89.0 mol %, polymerization degree: 3500, PVA235, produced by Kuraray Co., Ltd.) aqueous solution was added to 16.3 parts of purified water. 0.5 parts of 1%-by-mass aqueous solution of an anionic surfactant (Rapisol A30 produced by NOF CORPORATION) was further added to be finally finished to 150 parts with purified water, and, thus, to prepare a coating liquid H1 for the high refractive index layer.

(Preparation of Sample 1)

A slide hopper coater capable of coating and superimposing nine layers was used, and while each temperature of the coating liquid L1 for the low refractive index layer and the coating liquid H1 for the high refractive index layer was maintained at 45° C., simultaneous multi-layer coating of nine layers in total was performed on a polyethylene terephthalate film (A4300 manufactured by Toyobo Co., Ltd.: double-sided easy adhesive layer) heated to 45° C. and having a thickness of 50 μm so that the undermost layer and the uppermost layer were the low refractive index layers, other layers were alternately stacked, the thickness at the time of drying of each low refractive index layer was 150 nm, and the thickness at the time of drying of each high refractive index layer was 150 nm.

Immediately after coating, cooling air of 5° C. was blown against a coating, and set was performed. At this time, the time (set time) until nothing was adhered to a finger even if the finger touched the surface was 5 minutes.

After completion of set, hot air of 80° C. was blown against the coating to dry the coating and, thus, to produce a multi-layer coated product constituted of nine layers.

The multi-layer coating of nine layers were performed twice on the nine-layer coated product, and a sample 1 constituted of 27 layers in total was produced.

Example 2

Production of Sample 2

The coating liquid L2 for the low refractive index layer was prepared in a similar manner to the coating liquid L1 for the low refractive index layer except that the 4.0%-by-mass aqueous solution of silanol modified polyvinyl alcohol (PVA-R1130, produced by Kuraray Co., Ltd.) was changed to 304 parts, and 456 parts of 4.0%-by-mass aqueous solution of polyvinyl alcohol (PVA235, produced by Kuraray Co., Ltd.) was added.

A sample 2 was produced in a similar manner to the sample 1 except that the coating liquid L2 for the low refractive index layer was used instead of the coating liquid L1 for the low refractive index layer.

Example 3

(Production of Sample 3)

A coating liquid H3 for the high refractive index layer was prepared in a similar manner to the coating liquid H1 for the high refractive index layer except that the 4.0%-by-mass aqueous solution of polyvinyl alcohol (PVA-235, produced by Kuraray Co., Ltd.) was changed to 34 parts, and 7.9 parts of the 4.0%-by-mass aqueous solution of silanol modified polyvinyl alcohol (PVA-R1130, produced by Kuraray Co., Ltd.) was added.

A sample 3 was produced in a similar manner to the sample 2 except that the coating liquid H3 for the high refractive index layer was used instead of the coating liquid H1 for the high refractive index layer.

Example 4

(Production of Sample 4)

A coating liquid L4 for the low refractive index layer was prepared in a similar manner to the coating liquid L2 for the low refractive index layer except that the 4.0%-by-mass aqueous solution of silanol modified polyvinyl alcohol (PVA-R1130, produced by Kuraray Co., Ltd.) was changed to 152 parts, the 4.0%-by-mass aqueous solution of polyvinyl alcohol (PVA235, produced by Kuraray Co., Ltd.) was changed to 608 parts, and these aqueous solutions were added.

A sample 4 was produced in a similar manner to the sample 2 except that the coating liquid L4 for the low refractive index layer was used instead of the coating liquid L2 for the low refractive index layer.

Example 5

(Production of Sample 5)

A coating liquid L5 for the low refractive index layer was prepared in a similar manner to the coating liquid L2 for the low refractive index layer except that 456 parts of the 4.0%-by-mass aqueous solution of polyvinyl alcohol (PVA235, produced by Kuraray Co., Ltd.) was changed to 456 parts of 4.0%-by-mass aqueous solution of polyvinyl alcohol (PVA217, produced by Kuraray Co., Ltd.).

A sample 5 was produced in a similar manner to the sample 2 except that the coating liquid L5 for the low refractive index layer was used instead of the coating liquid L2 for the low refractive index layer.

Example 6

(Production of Sample 6)

A coating liquid L6 for the low refractive index layer was prepared in a similar manner to the coating liquid L2 for the low refractive index layer except that the boric acid aqueous solution was not added.

A sample 6 was produced in a similar manner to the sample 2 except that the coating liquid L6 for the low refractive index layer was used instead of the coating liquid L2 for the low refractive index layer.

Example 7

(Production of Sample 7)

A coating liquid H7 for the high refractive index layer was prepared in a similar manner to the coating liquid H1 for the high refractive index layer except that 28.9 parts of 20.0%-by-mass silica-modified titanium oxide particle sol was changed to 19.3 parts of 30%-by-mass zirconia particle water-based sol (particle diameter (volume average) 6 nm, NanoUse ZR-30BF, produced by Nissan Chemical Industries, Ltd.).

A sample 7 was produced in a similar manner to the sample 2 except that the coating liquid H7 for the high refractive index layer was used instead of the coating liquid H1 for the high refractive index layer.

Example 8

(Production of Sample 8)

A coating liquid L8 for the low refractive index layer was prepared in a similar manner to the coating liquid L2 for the low refractive index layer except that 456 parts of the 4.0%-by-mass aqueous solution of polyvinyl alcohol (PVA235, produced by Kuraray Co., Ltd.) was changed to 456 parts of the 4.0%-by-mass aqueous solution of polyvinyl alcohol (saponification degree: 87.0 to 89.0 mol %, polymerization degree: 1000, PVA210 produced by Kuraray Co., Ltd.).

A sample 8 was produced in a similar manner to the sample 2 except that the coating liquid L8 for the low refractive index layer was used instead of the coating liquid L2 for the low refractive index layer.

Comparative Example 1

(Production of Sample 9)

A coating liquid L9 for the low refractive index layer was prepared in a similar manner to the coating liquid L1 for the low refractive index layer except that the whole silanol modified polyvinyl alcohol was changed to polyvinyl alcohol (PVA235, produced by Kuraray Co., Ltd.).

A sample 9 was produced in a similar manner to the sample 1 except that the coating liquid L9 for the low refractive index layer was used instead of the coating liquid L1 for the low refractive index layer.

Example 9

(Production of Sample 10)

A sample 10 was produced in a similar manner to the example 2 except that coating was performed so that the film thickness of the undermost layer at the time of drying was 1800 nm in the example 2.

Example 10

(Production of Sample 11)

A sample 11 was produced in a similar manner to the example 2 except that coating was performed so that the film thickness of the undermost layer at the time of drying was 750 nm in the example 2.

Example 11

(Production of Sample 12)

A sample 12 was produced in a similar manner to the example 2 except that the rutile type titanium particles of the coating liquid H1 for the high refractive index layer used in the example 2 was changed to anatase type titanium dioxide (Tynoc A-6 produced by Taki Chemical Co., Ltd.).

Example 12

(Production of Sample 13)

A sample 13 was produced in a similar manner to Example 2 (sample 2) except that silanol modified polyvinyl alcohol (PVA-R1130) of the coating liquid L2 for the low refractive index layer used in Example 2 was changed to another silanol modified polyvinyl alcohol (polymerization degree of polyvinyl alcohol: 500, saponification degree: 98.6 mol %, R-2105, produced by Kuraray Co., Ltd.).

Example 13

(Production of Sample 14)

A sample 14 was produced in a similar manner to Example 3 (sample 3) except that silanol modified polyvinyl alcohol (PVA-R1130) of the coating liquid L2 for the low refractive index layer was changed to another silanol modified polyvinyl alcohol (polymerization degree of polyvinyl alcohol: 500, saponification degree: 98.6 mol %, R-2105, produced by Kuraray Co., Ltd.) in Example 3.

<<Evaluation of Infrared Shielding Film>>

Each performance of the coating liquids for the low refractive index layer used above and the infrared shielding films produced above was evaluated as follows.

(Measurement of Single Film Refractive Index of Each Layer)

A sample in which each layer (high refractive index layer and low refractive index layer) whose refractive index was to be measured was coated and provided in the form of a single layer on a substrate was produced, and the refractive index of each of the high refractive index layer and the low refractive index layer was obtained.

U-4000 type (manufactured by Hitachi, Ltd.) was used as a spectrophotometer, a back side of each sample as the side to be measured was subjected to roughening treatment, light absorption treatment was then performed using a black spray to prevent reflection of light on the back side, and the refractive index was obtained based on measurement results of the reflectance in a visible light region (400 nm to 700 nm) under the condition of 5-degree specular reflection.

As a result of measuring the refractive index of each layer in accordance with the above method, it was confirmed that each refractive index between the high refractive index and the low refractive index of the samples 1 to 14 was not less than 0.3.

(Measurement of Visible Light Transmittance and Infrared Transmittance)

The above spectrophotometer (using an integrating sphere, manufactured by Hitachi, Ltd., U-4000 type) was used, and each transmittance in a region of 300 nm to 2000 nm of the infrared shielding film samples 1 to 14 was measured. A value of the transmittance at 550 nm was used as the visible light transmittance, and a value of the transmittance at 1200 nm was used as the infrared transmittance.

(Measurement of film surface uniformity (haze value))

Regarding a haze value, the infrared shielding film samples 1 to 14 were measured by a haze meter (manufactured by Nippon Denshoku Industries Co., Ltd., NDH2000), and the haze values were evaluated as follows:

Not more than 1% ⊙

More than 1% to not more than 1.5% ○)

More than 1.5% to not more than 2% Δ

More than 2%×

(Measurement of film flexibility)

The infrared shielding film samples 1 to 14 were each cut into a size of 150 mm×200 mm and projected into ovens at 80° C. and 120° C. for 10 minutes, and the states of the film surfaces were evaluated visually, as follows:

○: no crack is observed at 120° C.

Δ: no crack is observed at 80° C., but cracks are observed in part at 120° C.

×: cracks are observed at 80° C.

(Coating liquid stability)

The above obtained coating liquids for the low refractive index layer were left at 50° C. for 5 hours, and a change of the viscosity per hour was evaluated as follows:

○: viscosity change is not more than 5 mPa·s

Δ: viscosity change is more than 5 mPa·s and not more than 10 mPa·s (Evaluation of adhesiveness)

After the infrared shielding film samples 1 to 14 were stored in 0.2% neutral detergent liquid at 25° C. for a predetermined period of time, each film state was observed, and the adhesiveness was evaluated as follows:

○: film peeling is not observed even after a lapse of 7 days

Δ: film peeling is observed in part after a lapse of 3 days

×: film peeling is observed in part after a lapse of 1 day

TABLE 1

| | | Low refractive index layer | | | | | High refractive index layer | |
|---|---|---|---|---|---|---|---|---|
| | Sample | SiOH-PVA | Other PVA | Polymerization degree | Hardening agent | Content of SiOH-PVA | PVA | Particle |
| Example 1 | 1 | R1130 | — | — | Boric acid | 30 wt % | PVA235 | Titanium oxide |
| Example 2 | 2 | R1130 | PVA235 | 3500 | Boric acid | 12 wt % | PVA235 | Titanium oxide |
| Example 3 | 3 | R1130 | PVA235 | 3500 | Boric acid | 12 wt % | R1130/PVA235 | Titanium oxide |
| Example 4 | 4 | R1130 | PVA235 | 3500 | Boric acid | 6 wt % | PVA235 | Titanium oxide |
| Example 5 | 5 | R1130 | PVA217 | 1700 | Boric acid | 12 wt % | PVA235 | Titanium oxide |
| Example 6 | 6 | R1130 | PVA235 | 3500 | — | 12 wt % | PVA235 | Titanium oxide |
| Example 7 | 7 | R1130 | PVA235 | 3500 | Boric acid | 12 wt % | PVA235 | Zirconium oxide |
| Example 8 | 8 | R1130 | PVA210 | 1000 | Boric acid | 12 wt % | PVA235 | Titanium oxide |
| Comparative Example 1 | 9 | — | PVA235 | 3500 | Boric acid | 0 wt % | PVA235 | Titanium oxide |

| | Visible light transmittance (%) | Infrared light transmittance (%) | Film surface uniformity (haze) | Flexibility | Stability of coating liquid for low refractive index layer | Evaluation of adhesiveness |
|---|---|---|---|---|---|---|
| Example 1 | 82 | 11 | ○ | ○ | Δ | Δ |
| Example 2 | 80 | 13 | ○ | ○ | ○ | Δ |
| Example 3 | 85 | 9 | ⊙ | ○ | ○ | Δ |
| Example 4 | 75 | 22 | Δ | ○ | ○ | Δ |
| Example 5 | 78 | 17 | Δ | ○ | ○ | Δ |
| Example 6 | 79 | 19 | Δ | ○ | ○ | Δ |
| Example 7 | 78 | 20 | ○ | ○ | ○ | Δ |
| Example 8 | 74 | 21 | Δ | Δ | ○ | Δ |
| Comparative Example 1 | 60 | 40 | X | X | Δ | X |

* In Table 1
PVA: polyvinyl alcohol
SiOH-PVA: silanol modified polyvinyl alcohol
Content of SiOH-PVA: content (% by weight) of SiOH-PVA based on total solid content of low refractive index layer

TABLE 2

| | | Low refractive index layer | | | | | High refractive index layer | |
|---|---|---|---|---|---|---|---|---|
| | Sample | SiOH-PVA | Other PVA | Polymerization degree | Hardening agent | Content of SiOH-PVA | PVA | Particle |
| Example 9 | 10 | R1130 | PVA235 | 3500 | Boric acid | 12 wt % | PVA235 | Titanium oxide |
| Example 10 | 11 | R1130 | PVA235 | 3500 | Boric acid | 12 wt % | PVA235 | Titanium oxide |

TABLE 2-continued

| | | | | | | | | | |
|---|---|---|---|---|---|---|---|---|---|
| Example 11 | 12 | R1130 | PVA235 | 3500 | Boric acid | 12 wt % | PVA235 | Titanium oxide (Tynoc A-6) | |
| Example 12 | 13 | R2105 | PVA235 | 3500 | Boric acid | 12 wt % | PVA235 | Titanium oxide | |
| Example 13 | 14 | R2105 | PVA235 | 3500 | Boric acid | 12 wt % | R1130/ PVA235 | Titanium oxide | |

| | Visible light transmittance (%) | Infrared light transmittance (%) | Film surface uniformity (haze) | Flexibility | Stability of coating liquid for low refractive index layer | Evaluation of adhesiveness |
|---|---|---|---|---|---|---|
| Example 9 | 83 | 11 | ⊙ | ○ | ○ | ○ |
| Example 10 | 85 | 9 | ⊙ | ○ | ○ | ○ |
| Example 11 | 78 | 15 | ○ | ○ | Δ | Δ |
| Example 12 | 80 | 14 | ○ | ○ | ○ | Δ |
| Example 13 | 83 | 10 | ⊙ | ○ | ○ | Δ |

\* In Table 2
PVA: polyvinyl alcohol
SiOH-PVA: silanol modified polyvinyl alcohol
Content of SiOH-PVA: content (% by weight) of SiOH-PVA based on total solid content of low refractive index layer It is preferable that the infrared shielding film has a high visible light transmittance and a low infrared transmittance, and it is more preferable that a coating has flexibility, and a coating surface is uniform. As seen in the result shown in Table 1, when the infrared shielding film samples 1 to 8 (Examples 1 to 8) according to the present invention are compared with the sample 9 of Comparative example 1, the samples 1 to 8 each have a higher visible light transmittance and more effective infrared shielding properties. Further, it is found that the samples 1 to 8 are each superior in the flexibility of a coating and the surface uniformity of the coating.

Furthermore, as seen in the results of the infrared shielding film samples 10 and 11 (Examples 9 and 10) according to the present invention, when the thickness of the undermost layer is increased relative to the thickness of other refractive index layers (average thickness), the film surface uniformity and the adhesiveness are excellent.

<<Production of Infrared Shielding Body>>

Example 14

[Production of Infrared Shielding Bodies 101 to 108]

The infrared shielding films of the samples 1 to 8 produced in Examples 1 to 8 were each adhered onto a transparent acrylic resin plate having a thickness of 5 mm and a size of 20 cm×20 cm with an acrylic adhesive to produce the infrared shielding bodies 101 to 108.

<<Evaluation of Infrared Shielding Body>>

The infrared shielding bodies 101 to 108 can be easily used although they are large in size. By virtue of the use of the infrared shielding films of the present invention, excellent infrared shielding properties could be confirmed.

The present application is based on Japanese Patent Application No. 2011-271500 filed on Dec. 12, 2011, and its disclosure is incorporated herein by reference in its entirety.

What is claimed is:

1. An optical laminate film comprising, on a substrate, at least one unit constituted of a high refractive index layer, and a low refractive index layer comprising metal oxide particles, unmodified polyvinyl alcohol having a polymerization degree of 1500 to 5000 and a silanol modified polyvinyl alcohol.

2. The optical laminate film according to claim 1, wherein the silanol modified polyvinyl alcohol is contained in an amount of 10 to 25% by mass based on 100% by mass of the total solid content of the low refractive index layer.

3. The optical laminate film according to claim 2, wherein the undermost refractive index layer closest to the substrate has a thickness of 5 to 12 times an average thickness of other refractive index layers.

4. The optical laminate film according to claim 3, wherein the high refractive index layer comprises a second silanol modified polyvinyl alcohol.

5. The optical laminate film according to claim 4, wherein the content of the second silanol modified polyvinyl alcohol is 1 to 40% by mass based on 100% by mass of the total solid content of the high refractive index layer.

6. The optical laminate film according to claim 1, wherein the high refractive index layer comprises rutile type titanium oxide.

7. The optical laminate film according to claim 1, wherein the high refractive index layer comprises a second silanol modified polyvinyl alcohol.

8. The optical laminate film according to claim 1, wherein at least one layer of the low refractive index layer or the high refractive index layer comprises at least one kind of a boron compound selected from the group consisting of boric acid, borate salt, and borax.

9. An infrared shielding body comprising, on at least one side of a base structure, the optical laminate film according to claim 1.

10. The optical laminate film according to claim 1, wherein there is a region in which the reflectance is more than 50% in a region with a wavelength of 900 nm to 1400 nm.

11. The optical laminate film according to claim 10, wherein the transmittance in a visible light region is not less than 50%.

12. The optical laminate film according to claim 11, wherein the total number of the high refractive index layers and the low refractive index layers is not more than 100.

13. The optical laminate film according to claim 12, wherein the entire thickness is 12 μm to 315 μm.

14. The optical laminate film according to claim 1, wherein the film comprises at least one functional layer on the opposite side of the substrate.

15. A method of manufacturing an optical laminate film, comprising the steps of:
applying, onto a substrate, a coating liquid for low refractive index layer comprising metal oxide particles, a silanol modified polyvinyl alcohol, a binder resin and an aqueous solvent, wherein the binder resin contained in the coating liquid for the low refractive index layer comprises an unmodified polyvinyl alcohol having a polymerization degree of 1500 to 5000, and a coating liquid for high refractive index layer comprising a binder resin and an aqueous solvent; and drying the substrate coated with the coating liquids.

16. The method of manufacturing an optical laminate film according to claim 15, wherein the substrate comprises an undercoat layer.

17. The method of manufacturing an optical laminate film according to claim 16, wherein the step of applying the coating liquids is a step of carrying out simultaneous multi-layer coating of the coating liquids.

18. An optical laminate film comprising, on a substrate, at least one unit constituted of a high refractive index layer comprising a first silanol modified polyvinyl alcohol, and a low refractive index layer comprising metal oxide particles and a second silanol modified polyvinyl alcohol.

19. The optical laminate film according to claim 18, wherein the second silanol modified polyvinyl alcohol is contained in an amount of 10 to 25% by mass based on 100% by mass of the total solid content of the low refractive index layer.

20. The optical laminate film according to claim 19, wherein the undermost refractive index layer closest to the substrate has a thickness of 5 to 12 times an average thickness of other refractive index layers.

21. The optical laminate film according to claim 19, wherein the low refractive index layer further comprises unmodified polyvinyl alcohol having a polymerization degree of 1500 to 5000.

22. The optical laminate film according to claim 18, wherein the content of the first silanol modified polyvinyl alcohol is 1 to 40% by mass based on 100% by mass of the total solid content of the high refractive index layer.

23. The optical laminate film according to claim 18, wherein the high refractive index layer comprises rutile type titanium oxide.

24. The optical laminate film according to claim 18, wherein at least one layer of the low refractive index layer or the high refractive index layer comprises at least one kind of a boron compound selected from the group consisting of boric acid, borate salt, and borax.

25. An infrared shielding body comprising, on at least one side of a base structure, the optical laminate film according to claim 18.

26. The optical laminate film according to claim 18, wherein there is a region in which the reflectance is more than 50% in a region with a wavelength of 900 nm to 1400 nm.

27. The optical laminate film according to claim 26, wherein the transmittance in a visible light region is not less than 50%.

28. The optical laminate film according to claim 27, wherein the total number of the high refractive index layers and the low refractive index layers is not more than 100.

29. The optical laminate film according to claim 28, wherein the entire thickness is 12 μm to 315 μm.

30. The optical laminate film according to claim 18, wherein the film comprises at least one functional layer on the opposite side of the substrate.

31. A method of manufacturing an optical laminate film, comprising the steps of:

applying, onto a substrate, a coating liquid for a high refractive index layer comprising a first silanol modified polyvinyl alcohol, a binder resin and an aqueous solvent, and a coating liquid for a low refractive index layer comprising metal oxide particles, a second silanol modified polyvinyl alcohol, a binder resin and an aqueous solvent; and drying the substrate coated with the coating liquids.

32. The method of manufacturing an optical laminate film according to claim 31, wherein the substrate comprises an undercoat layer.

33. The method of manufacturing an optical laminate film according to claim 32, wherein the step of applying the coating liquids is a step of carrying out simultaneous multi-layer coating of the coating liquids.

* * * * *